United States Patent Office 3,476,459
Patented Nov. 4, 1969

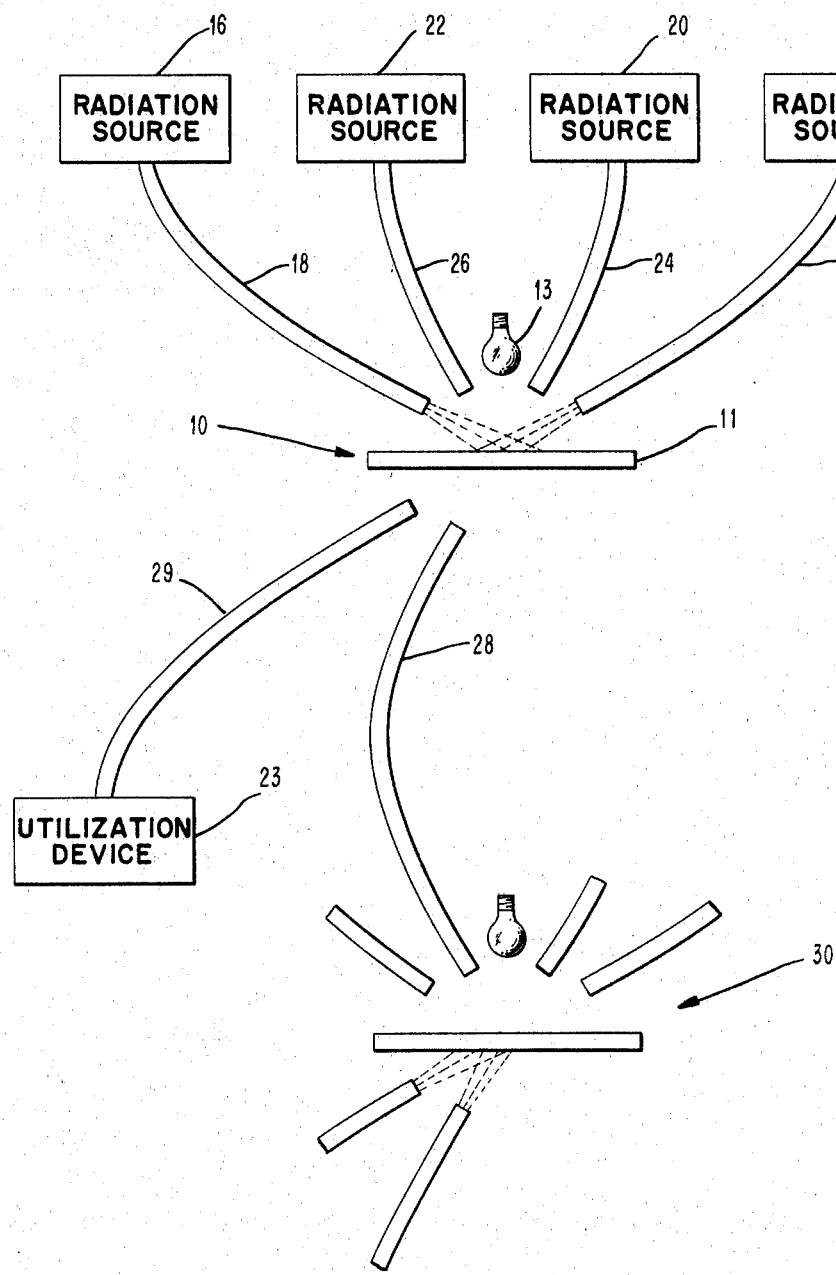

3,476,459
OPTICAL LOGIC SYSTEM WITH A SCREEN MADE OF PHOTOCHROMIC MATERIAL
Trevor D. Reader, King of Prussia, Pa., assignor to Sperry Rand Corporation, New York, N.Y., a corporation of Delaware
Filed Oct. 23, 1965, Ser. No. 503,969
Int. Cl. G02f 1/36
U.S. Cl. 350—160                                    4 Claims

ABSTRACT OF THE DISCLOSURE

An optical logic device is disclosed which includes a photochromic screen on which light from a fixed intensity source is focused in combination with one or more beams of selectively applied light. The selectively applied beams of light represent the input to the device and their presence in combination with the fixed intensity source causes the screen to become opaque. When the screen becomes opaque, light from the fixed intensity source is prevented from passing through the screen and therefore is prevented from energizing a light-sensitive output located on the side of the screen opposite the fixed intensity source.

---

This invention relates to optical devices, and more particularly to optical devices for use in logic systems.

In recent years, there have been new developments relating to photochromic materials, especially in glass and plastic. Also, the use of glass fibers as means for transmitting light from one point to another has advanced tremendously in recent years.

Normal glass, as is well known, has the characteristic of being transparent to light. Various types of plastic and other materials have also been made transparent to light.

Photochromic materials, on the other hand, have a characteristic that they tend to darken when they are exposed to light. If the applied light is of sufficient intensity, photochromic materials tend to become opaque. Glass, certain types of plastic and other types of material have been made photochromic by varying the chemical compositions thereof by adding thereto various compounds to give them photochromic qualities. The subject invention is not directly concerned with the chemical composition of the materials involved but deals generally with devices having the characteristic of darkening or become opaque when exposed to light.

Some types of photochromic materials are described briefly in articles appearing in "Material in Design Engineering," April 1964, pages 153 and 155, in an article entitled "Chameleon Glass Goes On and Off Forever" and in "Material in Design Engineering," May 1965, pages 156 and 158, in an article entitled "Glass, Plastics Darken When Exposed to Light."

One type of glass material may include similar silver halide particles embedded therein to give it the characteristic of darkening when exposed to light. Photochromic plastic may include materials such as butyrate, methacrylate or cellulose acetate butyrate, as pointed out in the second of the aforementioned articles.

In general, the transmission properties of photochromic materials are controlled by the chemical compositions of the materials used, as well as being dependent to some extent upon the type and intensity of the signals with which the materials are used. The frequencies of the signals with which the photochromic materials are used may also affect the transmission properties of the materials. For example, a material may have certain desirable characteristics for light signals in the visual range of frequencies and exhibit different characteristics for signals in the infrared range of frequencies. Also, the response and recovery times of the materials used, i.e., the time it takes for a material to return to its transparent condition after light signals have been removed, is dependent to a great extent upon the chemical composition of the materials and the frequencies of the signals involved.

The use of glass fibers for transmitting liquid from one point to another is described in the May 20, 1965 issue of "Iron Age" pages 65 to 68 in an article by T. H. Malin entitled "Bent Light Opens Up Dark Places."

In general, the glass fibers described in the last mentioned articles includes fibers which transmit visible light. Anywhere from one hundred to more than a million fibers may form a pipe capable of being bent almost into any shape. Each fiber is generally clad with a glass coating of low refractive index to prevent "cross-talk" or light leaking from one fiber to another. Thus, the use of flexible glass fibers makes it possible to design systems wherein light need not be transmitted in straight lines.

The advances in the fields of photochromic materials and glass fibers have opened up opportunities in the logic field which conceivably could bring about new and more efficient computer systems.

In accordance with the present invention, an optically sensitive screen which darkens when exposed to light is provided. A light source provides a relatively fixed amount of light over the surface of the screen. The light from this source is not of sufficient amplitude to cause the screen to become opaque. One or more optic fibers selectively direct light from one or more sources towards the screen to cause the screen to become opaque when light from the light source and the one or more fibers is simultaneously applied thereto. Thus, the invention is capable of providing an improved logic device utilizing optical signals.

The present invention and numerous modifications thereof will become apparent to those skilled in the art, from a reading of the following specification and claims, in connection with the accompaying drawing, in which the sole figure of the drawing illustrates schematically a logic system, in accordance with the present invention.

Referring to the drawing, one stage 10 of an optical logic system includes an optically sensitive screen 11 which comprises a photochromic material. The screen 11 has the characteristic of darkening or becoming opaque when light of sufficient intensity is applied thereto. This material may, for example, be glass or plastics of the types discussed in the aforementioned articles.

Light from a source 13, which may be an electric bulb or other suitable source, is directed towards the screen. The source of light from the source 13 may be of relatively constant amplitude and applied continuously to the screen 11. The amplitude of the light from the source 13 is normally not sufficient to cause the screen 11 to become opaque. The light from the source 13 is directed to shed light on the entire surface of the screen 11.

Additional light may be directed towards the screen 11 from a radiation source 12 through an optic fiber 14. The light from the source 12 may be selectively applied to the screen 11. Additional sources of radiation 16, 22 and 20 may direct light toward the screen 11 through optic fibers 18, 26 and 24, respectively. The light signals from the optic fibers may represent information relating to certain conditions within a computer system, for example.

The light from the glass fibers may emerge as substantially narrow straight beams and directed towards selected small areas of the screen 11. In many conventional types of glass fibers, the light will emerge in the same direction at which it entered. Thus, if light is applied to fibers in a straight direction, they will emerge in the same direction. Likewise, if the light is diffused when it enters the glass fibers, it will emerge diffused. In the preferred embodiments of the present invention, the light beams involve relatively straight transmission paths.

The alignment of the particular fibers 18, 26, 24 and 14 will depend upon the refractive properties of the screen 11, and the alignment of the output fibers leading from the screen 11, as well as other conditions present in the system.

When no light is directed from the radiation sources 12, 16, 20 and 22 through their respective fibers, the screen 11 will be transparent to permit light from the source 13 to pass through the screen 11 to output optic fibers 28 and 29. However, if light from one or more of the fibers 12, 18, 24 or 26 is directed toward the screen 11, the screen 11 will become opaque. The system may, of course, be designed so that light from any one of the radiation sources will be sufficient to cause the screen 11 to become opaque. On the other hand, it may be desirable to have light from more than one of the sources to be present before the screen 11 becomes opaque.

The screen 11 may become opaque only in the areas which receive light signals from the optic fibers. The surface of the screen not receiving the light beams may continue to be transparent. Output fibers 28 and 29 may be angularly disposed to detect or receive light signals emanating from the screen 11.

Any output optical signal from the optic fiber 28 is transmitted to the next stage to an optic device 30 which is substantially the same as the device 11 described. The glass fiber 29 may be used to transmit light signals to a utilization device 23.

The arrangement described may be used in performing numerous different logic functions normally associated with computer operations. For example, it may be used as a NOR gate circuit in which the output signal is low when all input signals are high. It may also be used as a simple invertor circuit in which a high input signal produces a low output signal. Numerous other logic operations utilizing the subject invention would be apparent to those skilled in the computer field.

The entire system may, of course, be housed with partitions between stages so that particular stages may be normally exposed to light with other stages not normally exposed to light. For example, the area between the screens of stages 10 and 30 may be enclosed to provide a normal condition with light, as illustrated, or designed to have a normal "no light" condition. The numerous mechanical arrangement for implementing the present invention are well known to those skilled in the art and are therefore not illustrated in detail since they are not directly related to the subject invention.

The embodiments of the invention in which an exclusive property or privilege is claimed are defined as follows:

1. In combination with a screen of photochromic material which becomes opaque when exposed to light of a predetermined intensity, a logic device comprising means for continuously applying light of relatively fixed intensity to said screen, said light being of insufficient intensity to cause said screen to become opaque thereby permitting said light to pass therethrough, an optic glass fiber for selectively directing relatively straight beams of light towards said screen, the portions of said screen receiving said light beams becoming opaque when light from said means and said fiber is simultaneously applied thereto whereby no light is permitted to pass through said screen in the portions receiving said light beams, and means including a second optic fiber disposed to receive light passing through said screen.

2. In combination with a two sided optically sensitive screen which becomes opaque when exposed to light of a predetermined intensity, a logic device comprising means for applying light of relatively fixed intensity to said screen, said light being of insufficient intensity to cause said screen to become opaque thereby normally permitting light to pass therethrough, a plurality of input optic fibers disposed on one side of said screen, for selectively directing beams of light towards said screen, said screen becoming opaque when light from said means and said fibers is simultaneously applied thereto, and at least one output optic fiber disposed on the other side of said screen to receive light passing through said screen.

3. The invention as set forth in claim 2 wherein a plurality of output fibers are disposed on the other side of said screen to receive light passing through said screen from said plurality of input fibers.

4. A logic network comprising a first optical logic device which includes; a screen of photochromic material which becomes opaque when exposed to light of a predetermined intensity, means applying a relatively fixed intensity source of light to said screen, and means for selectively directing one or more beams of light toward said screen so as to render said screen opaque in the presence of light from said fixed source and said one or more beams of light, a second similar logical device, and an optical fiber disposed to direct the light which passes through the screen of the first device from the fixed intensity source to the screen of the second device.

References Cited

UNITED STATES PATENTS

| | | | |
|---|---|---|---|
| 3,215,988 | 11/1965 | Clapp | 330—4.3 |
| 3,270,291 | 8/1966 | Kosonocky | 331—94.5 |
| 3,323,244 | 6/1967 | Schreiber. | |

OTHER REFERENCES

"Nonlinear Absorbers of Light," R. W. Keyes, IBM Journal of Research and Development, vol. 7, #4, October 1963, pp. 334–336.

RONALD L. WILBERT, Primary Examiner

V. P. McGRAW, Assistant Examiner

U.S. Cl. X.R.

250—227; 307—311